(12) United States Patent
Sumner

(10) Patent No.: US 7,578,234 B2
(45) Date of Patent: Aug. 25, 2009

(54) METHOD OF MAKING AND USING A KITCHEN RECEPTACLE FOR THE COLLECTION AND TRANSFER OF FOOD MATERIAL

(76) Inventor: Wallace Maurice Sumner, 1697 Hillside St., Marietta, GA (US) 30066-4194

(\*) Notice: Subject to any disclaimer, the term of this patent is extended or adjusted under 35 U.S.C. 154(b) by 689 days.

(21) Appl. No.: 10/908,929

(22) Filed: Jun. 1, 2005

(65) Prior Publication Data

US 2006/0213377 A1   Sep. 28, 2006

Related U.S. Application Data

(60) Provisional application No. 60/594,255, filed on Mar. 23, 2005.

(51) Int. Cl.
*A47J 47/00* (2006.01)
*A47J 47/01* (2006.01)

(52) U.S. Cl. .................. 99/537; 99/646 C; 269/15; 269/289 R

(58) Field of Classification Search .............. 269/15; 15/257.9; 99/646 C
See application file for complete search history.

(56) References Cited

U.S. PATENT DOCUMENTS

| | | | | |
|---|---|---|---|---|
| D43,123 S | * | 10/1912 | Strassburger | D32/74 |
| 3,082,455 A | * | 3/1963 | Evancha | 15/105 |
| 3,390,804 A | * | 7/1968 | Morgan | 220/324 |
| 3,598,164 A | * | 8/1971 | August | 269/13 |
| 4,273,318 A | | 6/1981 | Crowhurst | |
| D283,062 S | | 3/1986 | Lordi | |
| 5,020,185 A | | 6/1991 | Hoefler | |
| 5,203,548 A | * | 4/1993 | Sanders | 269/302.1 |
| 6,220,560 B1 | | 4/2001 | Bugeja | |
| D458,091 S | * | 6/2002 | Wallays et al. | D7/692 |
| D467,776 S | * | 12/2002 | Cole | D7/698 |
| D473,988 S | | 4/2003 | Miller | |
| 7,252,255 B2 | * | 8/2007 | Cornfield | 241/274 |
| D555,986 S | * | 11/2007 | Goldman et al. | D7/698 |
| 2002/0185801 A1 | * | 12/2002 | Cautereels et al. | 269/289 R |
| 2003/0173366 A1 | * | 9/2003 | Littlejohn et al. | 220/574 |

OTHER PUBLICATIONS

"Paper Plate and Paper Cup Crafts for Kids, 'Sun, Moon, and Stars Mobile Craft,' & 'Noah's Ark with Rainbow Paper Plate Craft,'" Carolyn Warvel, 2001, pp. 1 & 10-12; http://www.daniellesplace.com/HTML/paperplate.html.*

\* cited by examiner

*Primary Examiner*—Joseph M Pelham

(57) ABSTRACT

The present invention relates to a method of making and using an economical and disposable kitchen utensil, by forming a dished, semi-circular or semi-elliptical receptacle, by cutting an existing dished circular or elliptical food plate in half, resulting in two matching units, or by manufacturing a dished semi-circular or semi-elliptical receptacle in the shape of half of a dished circular or elliptical food plate, that will be used for the collection and transfer of prepared food items located atop a kitchen chop board or countertop surface to a cooking, serving, refuse or other kitchen receptacle.

1 Claim, 9 Drawing Sheets

METHOD OF MAKING AND USING A KITCHEN RECEPTACLE FOR THE COLLECTION AND TRANSFER OF FOOD MATERIAL

BACKGROUND OF THE INVENTION

The present invention relates to a method of making and using an economical and disposable kitchen utensil, by forming a dished, semi-circular or semi-elliptical receptacle, by cutting an existing dished circular or elliptical food plate in half, resulting in two matching units, or by manufacturing a dished semi-circular or semi-elliptical receptacle in the shape of half of a dished circular or elliptical food plate, that will be used for the collection and transfer of prepared food items located atop a kitchen chop board or countertop surface to a cooking, serving, refuse or other kitchen receptacle.

Food items such as meats and vegetables for example are commonly prepared by cutting, chopping or mincing them into smaller pieces atop a kitchen chop board or countertop surface. Once the food items have been reduced to smaller pieces the prepared food items are then collected and transferred from the chop board or countertop surface to a cooking, serving, refuse or other kitchen receptacle by several common uneconomical, inefficient, unsanitary and wasteful methods.

One current method involves the lifting and carrying of a chop board, typically having no lifting handle provisions, with prepared food items atop in order to transfer the prepared food items to a kitchen cooking or serving receptacle or the like. The prepared food items are transferred to the receptacle by tilting the chop board and scraping or raking the prepared food items into the receptacle.

This first method is inefficient and undesirable as the chop board with the prepared food items, is bulky, heavy, and cumbersome to lift and balance, thus resulting in awkward tilting and scraping or raking of the prepared food items into the receptacle. This awkward balancing, tilting and scraping or raking causes a random plurality of the prepared food items to unsuccessfully enter the receptacle and undesirably fall onto other surfaces resulting in a messy and wasteful transfer of the prepared food items as well as lost food preparation time. In addition unwanted juices may enter the receptacle and/or undesirably also fall from the chop board.

Also, as a result of the lifting, the awkward balancing and tilting, and the scraping or raking, food items that are rollably-shaped may roll or slide off the chop board.

In addition the first method is also dangerous if the cooking receptacle contains hot oil or grease. The awkward tilting and raking can cause the prepared food items to enter the receptacle haphazardly and harmfully splash hot oil or grease upon cooking personnel, as well as allowing the potential for a fire hazard.

Also in addition, the first method is obviously extremely difficult, undesirable, sometimes impossible and far more dangerous for disabled, arthritis-stricken and similarly handicapped users, as well as for young children.

A second current method involves the use of a typical circular eating plate as a collection and transfer device for prepared food items atop a chop board by randomly placing a distal top surface portion of the eating plate directly beneath the bottom of the chop board, and then collecting the prepared food items by scraping or raking the prepared food items onto and received by the remaining exposed proximal top surface portion of the eating plate. After the prepared food items are collected, the eating plate is then removed from beneath the chop board, and then used to transfer the prepared food items to a kitchen cooking or serving receptacle or the like by several means including scraping or raking the prepared food items, shaking the eating plate, tilting the eating plate, or a combination thereof, thus allowing the prepared food items to enter the receptacle. Using this second method, initially the chop board must be undesirably lifted as the distal top surface portion of the eating plate is positioned beneath the chop board. After the prepared food items are collected the chop board must be lifted a second additional time in order to remove the distal top surface portion of the eating plate so that the transfer process can begin.

As a result of the chop board lifting and plate positioning, and the chop board lifting and plate removal, the prepared food items and any juices may undesirably flow, slide or roll off the chop board.

In addition this second method is also inefficient, wasteful and unsanitary as only a limited first random plurality of the raked prepared food items are received and collected upon the proximal top surface portion, while a second random plurality of the raked prepared food items are undesirably received and collected onto other surfaces. The limited first random plurality collected on the proximal top surface portion, and the second random plurality undesirably collected elsewhere, is due to the eating plate being circular in shape, and the distal top surface portion of the eating plate randomly placed beneath the chop board. This random placement beneath the chop board does not provide the maximum available surface collection area of the eating plate.

In addition if the eating plate is non-disposable, the plate must be washed, rinsed and dried creating additional water usage and electrical energy costs.

A third current method involves the use of a typical circular eating plate as a collection and transfer device for prepared food items atop a chop board or countertop by positioning a distal outer arc edge portion of the eating plate against a chop board or countertop raking edge end portion, thus allowing for the scraping or raking of the prepared food items onto the eating plate.

After the prepared food items are collected the eating plate is then used to transfer the prepared food items to a kitchen cooking or serving receptacle or the like by several means including scraping or raking the prepared food items, shaking the eating plate, tilting the eating plate, or a combination thereof, thus allowing the prepared food items to enter the receptacle.

This third method is also inefficient, wasteful and unsanitary as only a limited first random plurality of the raked prepared food items are received and collected upon the eating plate, while a second random plurality of the raked prepared food items and any juices are undesirably received and collected onto other surfaces. The first random plurality collected on the eating plate, and the second random plurality undesirably collected elsewhere, is due to the eating plate being circular in shape, and the distal outer arc edge portion of the eating plate being butted against the chop board or countertop raking edge end portion consequentially limiting the maximum available surface collection area of the distal top surface portion.

In addition if the eating plate is non-disposable, the plate must be washed, rinsed and dried creating additional water usage and electrical energy costs.

A need therefore obviously exists for an improved, simple, economically manufactured, more efficient, water saving, electrical energy cost saving, sanitary and disposable kitchen utensil that provides the maximum available surface collection area for receiving prepared food items from atop a chop board or countertop surface, and for subsequently transferring the prepared food items to a cooking, serving, refuse or other kitchen receptacle while minimizing or completely avoiding the receipt and collection of the prepared food items undesirably elsewhere.

Also a need exists for the same kitchen utensil which is safer and easier to use by disabled, arthritis-stricken and similarly handicapped users, and by young children.

BRIEF SUMMARY OF THE INVENTION

The object of the present invention is to provide a method of making and using a kitchen receptacle resulting in an economically formed or manufactured, improved, simple, more efficient, water saving, electrical energy cost saving, sanitary and disposable kitchen utensil for chop board and countertop use. This new kitchen utensil comprises an abutting straight edge end portion that provides the maximum surface collection area for receiving and collecting a maximum plurality of prepared food items from atop a chop board or countertop surface, and for subsequently transferring the prepared food items to a cooking, serving, refuse or other kitchen receptacle while minimizing or completely avoiding the receipt and collection of the prepared food items undesirably elsewhere. In addition it is an object of the present invention to provide a kitchen utensil which is safer and easier to use by disabled, arthritis-stricken and similarly handicapped users, and by young children.

As a secondary feature it is also an object of the present invention, as described above, to provide a kitchen utensil that additionally can be used for receiving and collecting a maximum plurality of food scraps, food crumbs, food waste or general non-food debris located atop a kitchen chop board, kitchen countertop, kitchen appliance, microwave heating surface, kitchen eating table, dining room table, portable eating tray, other eating or food preparing surfaces, a general household furniture table top surface, picnic table surface, restaurant table, eating table chair seating surface, or other similar surfaces, to a kitchen refuse receptacle, or the like, or other destination while minimizing or completely avoiding the receipt and collection of waste food items undesirably elsewhere.

As the preferred embodiment the present invention would be constructed comprising the steps of forming a dished, semi-circular or semi-elliptical receptacle by cutting an existing dished circular or elliptical food plate in half, resulting in two matching units, or by manufacturing a dished semi-circular or semi-elliptical receptacle in the shape of half of a dished circular or elliptical food plate.

During use the straight edge portion of the semi-circular or semi-elliptical shape will be butted against the raking edge end portion of a chop board, countertop, dining table or other similar horizontal planar surface with prepared food items or waste material atop. This abutting flush communication uniquely provides a means for efficient placement of the present invention consequently providing a maximum available surface collection area for raked prepared food items or waste material and simultaneously minimizing or completely avoiding the receipt and collection of food items or waste material upon a floor or other undesirable surface.

The present invention may be fabricated from bendable material to help channel and discharge said food items directly into a receptacle, including plastic food storage bags and the like.

Previously manufactured whole or partial paper plates, or similarly shaped paper-type products that have been damaged or rejected, can be salvaged and easily converted into semi-circular or semi-elliptical shapes, offering manufacturers economic and production savings and benefits, as well as new product lines.

The present novel kitchen utensil may be manufactured having different thicknesses, different radii, different flared rim or lip designs, different coatings, different decorations, and different printing. The present invention may be stacked, packaged and dispensed using the same methods employed for existing disposable plates.

Clearly the present invention is novel and a significant improvement over the prior art and standard methods and practices that are currently employed.

DETAILED DESCRIPTION OF THE INVENTION

Figure 1:
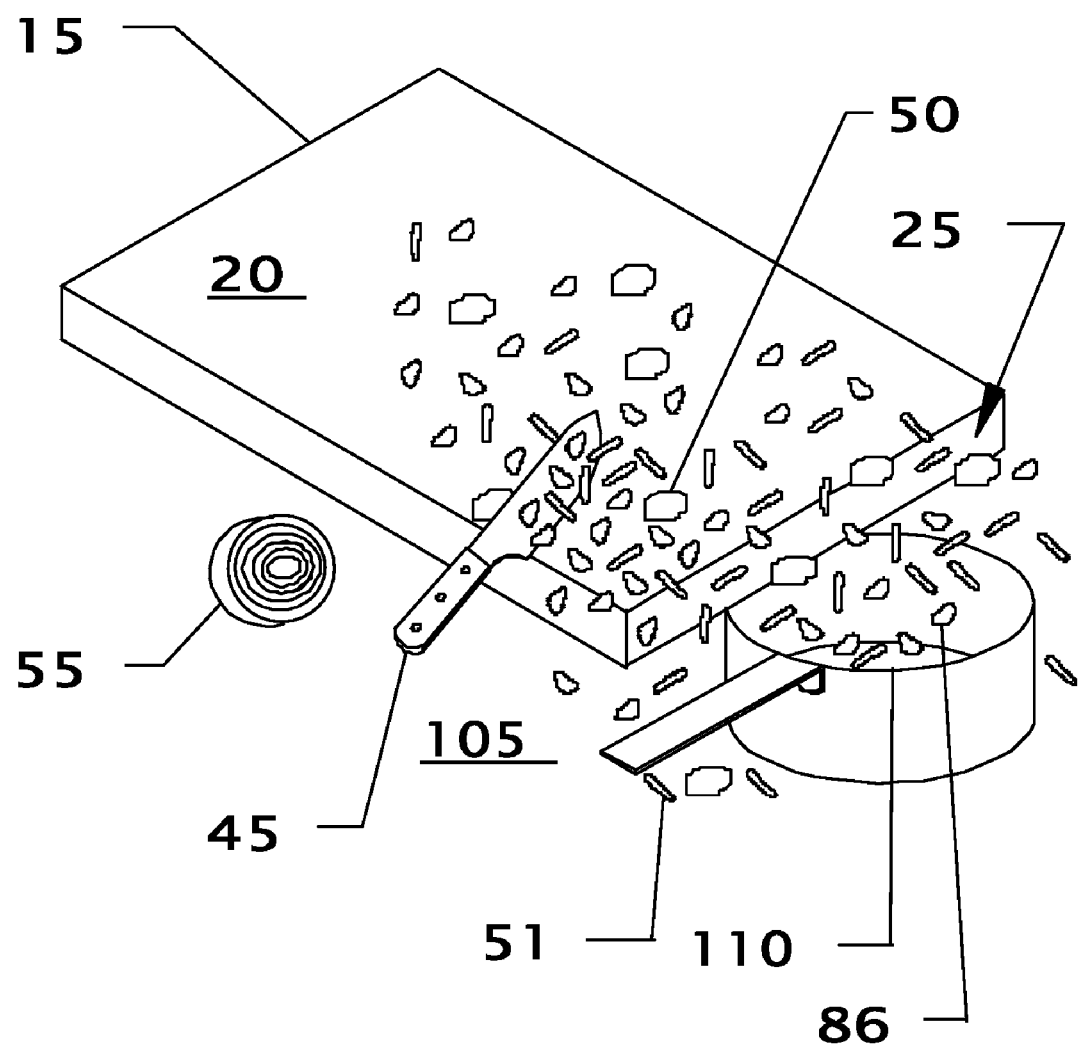
FIG. 1 is a perspective view of the prior art depicting a typical kitchen chop board as a collection and transfer device.

FIG. 1 shows a food item 55 that has been cut and chopped into a plurality of prepared food items 50 and collected atop a chop board top surface 20 of a typical kitchen chop board 15. FIG. 1 depicts prior art chop board 15, after being manually lifted, balanced and carried, and then awkwardly tilted toward and held above a receptacle 110. Said prepared food items are then transferred to said receptacle by awkwardly raking, using a raking means such as a typical kitchen knife 45, toward and over a chop board raking edge end portion 25 allowing a first random plurality 86 of said prepared food items to enter said receptacle by gravity. Said awkward tilting and raking also causes a second random plurality 51 of said prepared food items to unsuccessfully enter said receptacle but rather undesirably onto an adjacent surrounding surface 105. In addition said awkward tilting and raking also causes food item 55 to undesirably roll off said chop board surface. This inefficient prior art is unsanitary, messy and wasteful for the transfer of prepared food items from atop a typical chop board to a kitchen receptacle.

Figure 2:
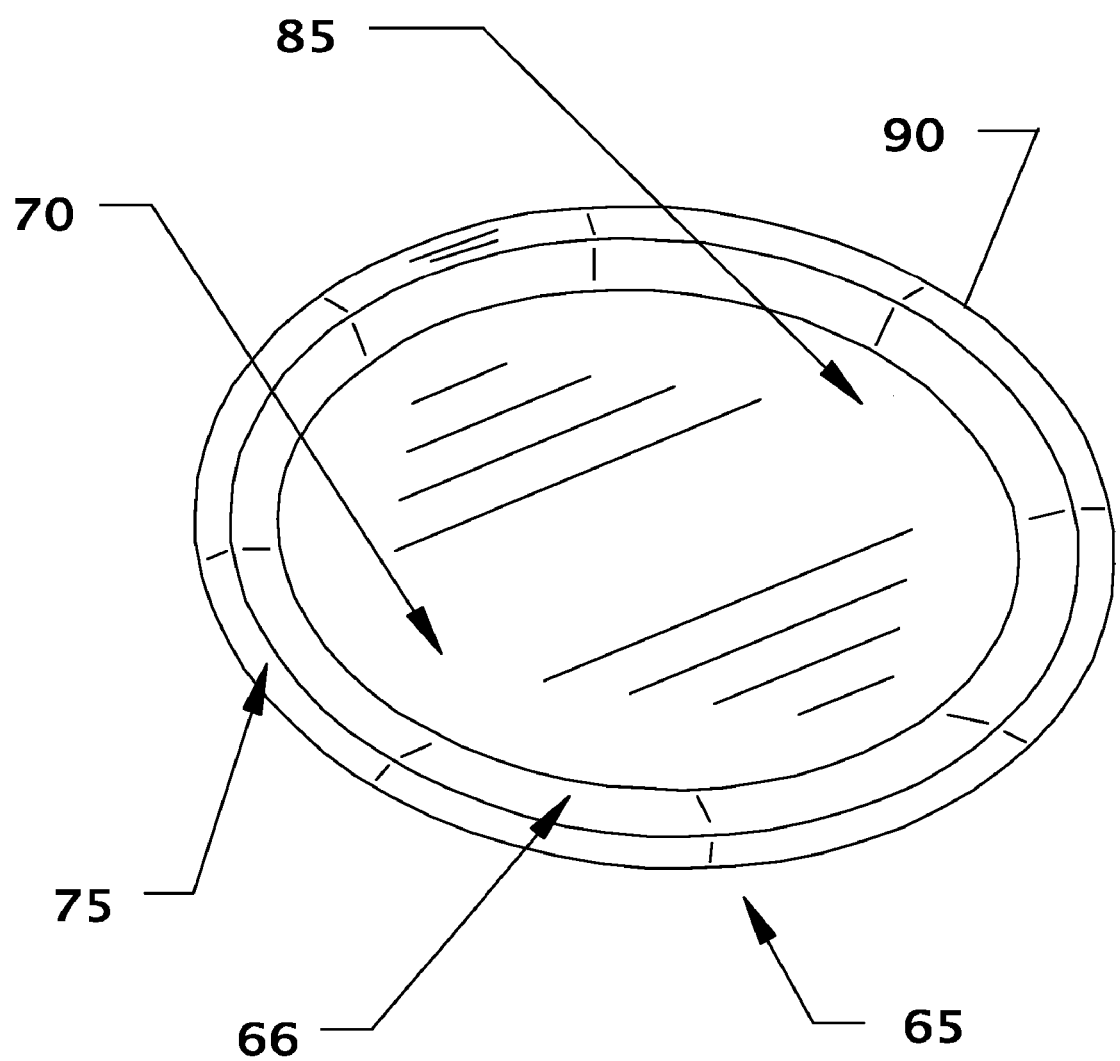
FIG. 2 is a perspective view of the prior art depicting a typical circular eating plate as a collection and transfer device.

FIG. 2 shows the primary components of a typical circular eating plate that are involved in the prior art relevant to the present invention. It is not the intention of FIG. 2 to limit said prior art to that of only a circular plate. Prior art consists of elliptical plates as well. In addition, those skilled in the art are aware that either shaped plate is available with different rim designs and configurations.

FIG. 2 depicts a typical prior art circular eating plate 65 comprised of a distal top surface portion 85, a proximal top surface portion 70, a flared wall portion 66, a distal outer arc edge portion 90 and a flared outer circular rim portion 75.

Figure 3:
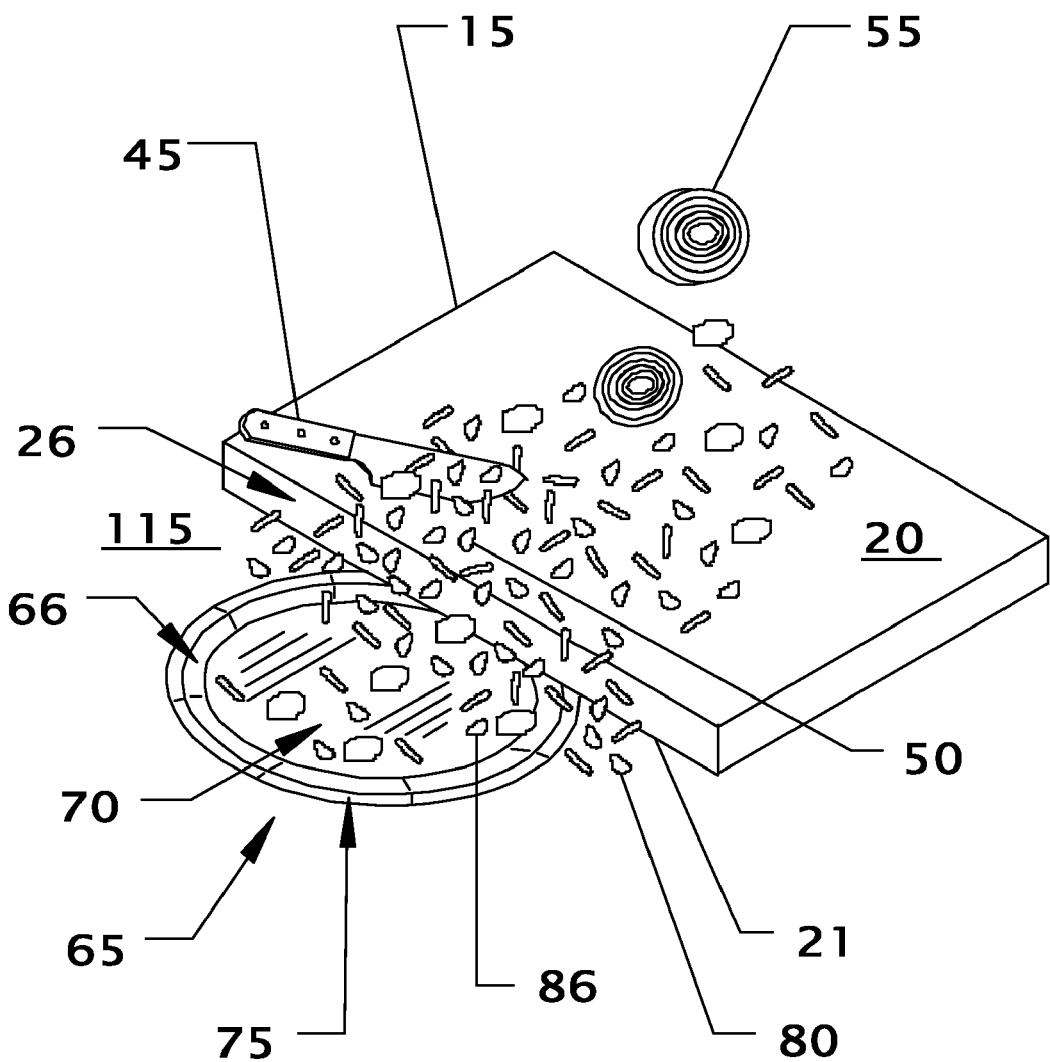
FIG. 3 is a perspective view of the prior art depicting a typical circular eating plate used as a collection and transfer device by being positioned beneath a typical kitchen chop board.

FIG. 3 depicts a prior art method of use for circular eating plate 65, wherein distal top surface portion 85 and distal outer arc edge portion 90, which are not visible in this figure, are randomly positioned beneath a bottom surface portion 21 of chop board 15 without a means for efficient placement. Said prepared food items 50 are then raked toward and over a chop board raking edge end portion 26 allowing a first random plurality 86 of said raked food items to be received and collected upon proximal top surface portion 70, and also allowing a second random plurality 80 of said raked food items to be undesirably collected upon an adjacent surface 115. In addition, said chop board with said food items atop, must be lifted and tilted in order to accommodate said placement. Said chop board must be lifted again in order to remove said eating plate so that first random plurality 86 can then be transferred to a kitchen receptacle. Said lifting, tilting and removal can cause food items 50 or food item 55 to undesirably slide or roll off chop board surface 20. This inefficient prior art is unsanitary, messy and wasteful for the collection and transfer of prepared food items from atop a chop board to a kitchen receptacle or the like.

Figure 4:
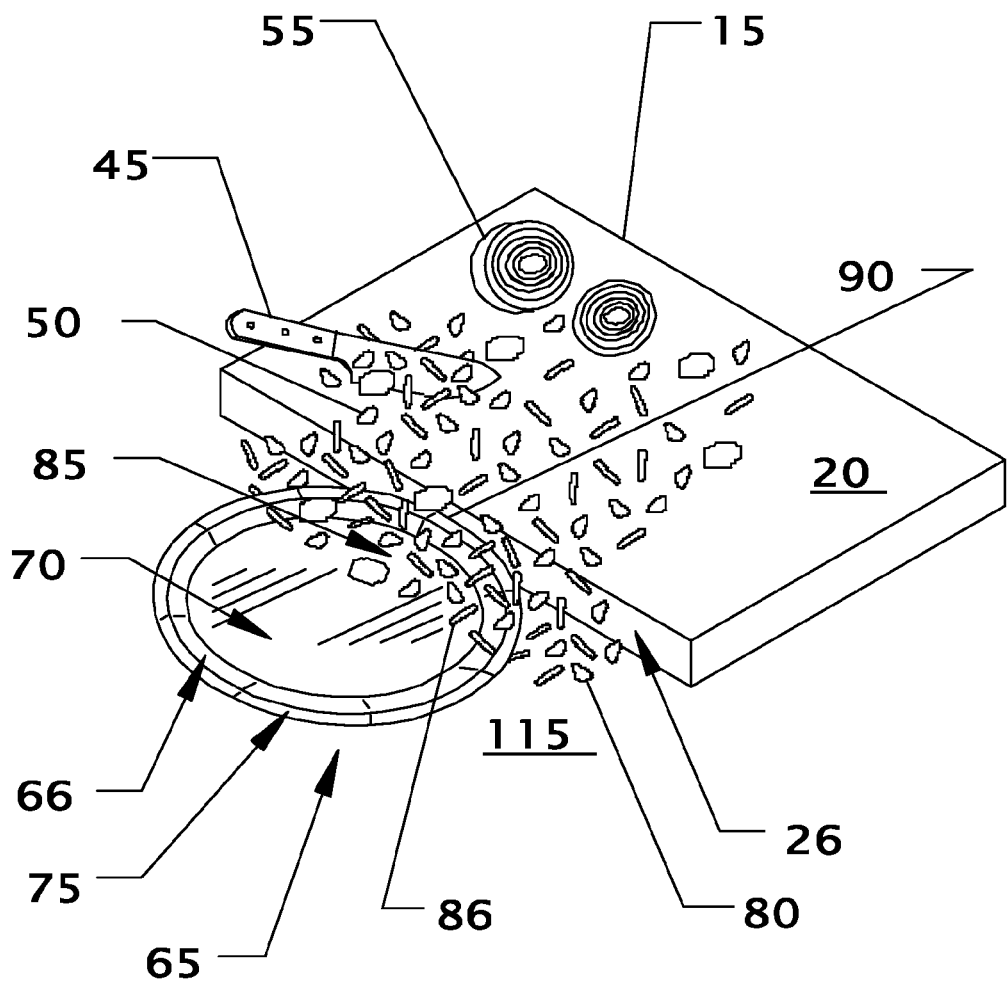
FIG. 4 is a perspective view of the prior art depicting a typical circular eating plate used as a collection and transfer device by being butted against a typical kitchen chop board.

FIG. 4 depicts a prior art method of use for circular eating plate 65, wherein a distal outer arc edge portion 90 is positioned against raking edge end portion 26, allowing a first random plurality 86 to be received and collected upon distal top surface portion 85, and also allowing a second random plurality 80 to be undesirably collected upon an adjacent surface 115. Said first random plurality received and collected upon said distal top surface portion, and said second random plurality undesirably collected upon said adjacent surface, is due to said eating plate being circular in shape, and said distal outer arc edge portion being butted against chop board raking edge end portion 26, consequentially limiting the available surface collection area of said distal top surface portion.

The most efficient placement of circular eating plate 65 for the collection of raked food items as shown in FIG. 4 occurs when a centerline of circular eating plate 65 is in flush communication with and parallel to raking edge end portion 26 of said chop board.

The inefficient prior art shown in FIG. 4 is unsanitary, messy and wasteful for the collection and transfer of prepared food items from atop a chop board to a kitchen receptacle.

Figure 5:
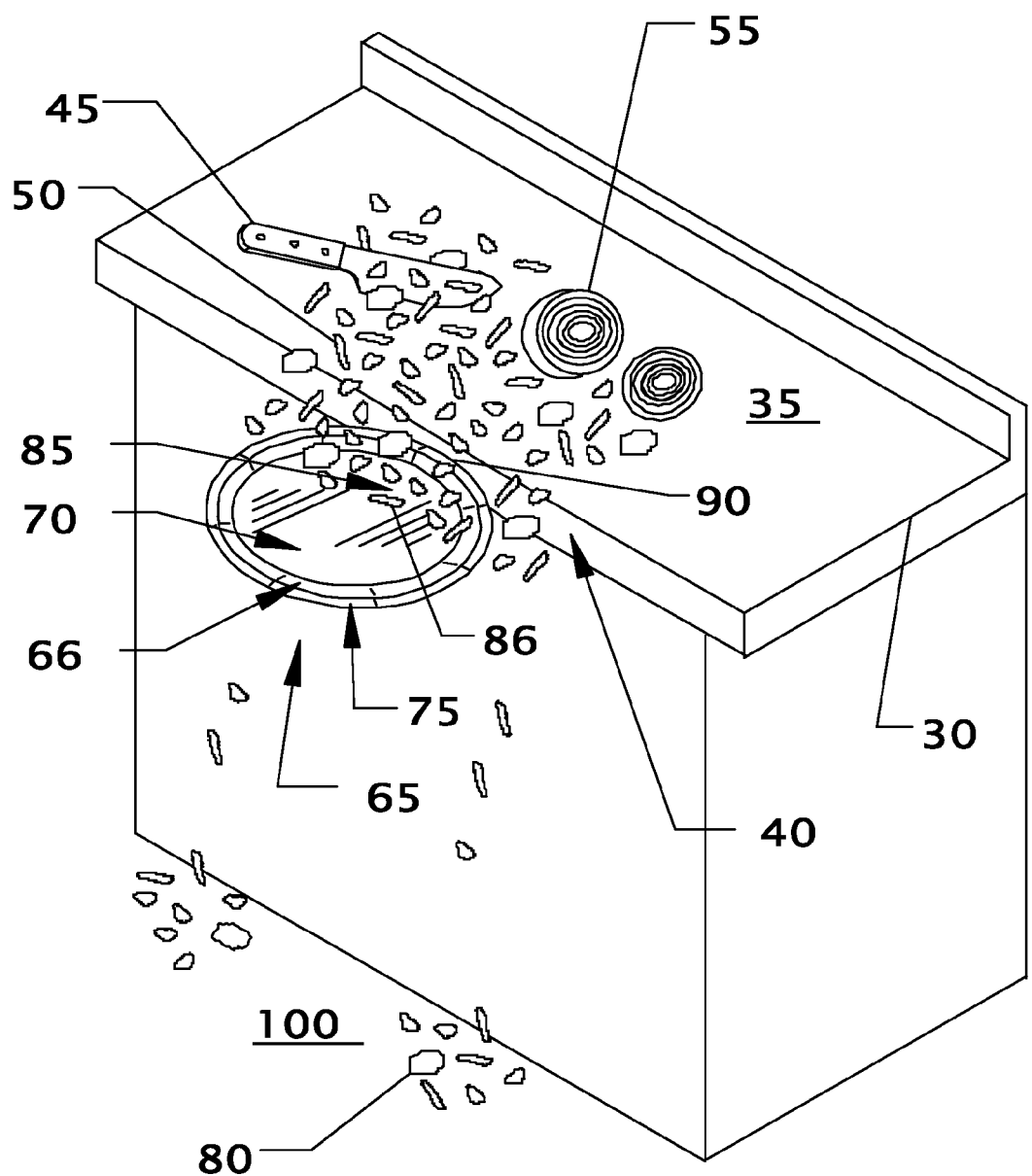
FIG. 5 is a perspective view of the prior art depicting a typical circular eating plate used as a collection and transfer device by being butted against a typical kitchen countertop.

FIG. 5 depicts a prior art method of use quite similar to that as shown in FIG. 4 wherein distal outer arc edge portion 90 of eating plate 65 is positioned against countertop raking edge end portion 40 of a typical kitchen countertop 30 allowing a first random plurality 86 of prepared food items 50 atop a countertop surface 35 to be received and collected upon distal top surface portion 85, and also allowing a second random plurality 80 to be undesirably received and collected upon a kitchen floor surface 100. Said first random plurality received and collected upon said distal top surface portion, and said second random plurality undesirably received and collected upon said kitchen floor surface, is due to said eating plate being circular in shape, and said distal outer arc edge portion being butted against said countertop raking edge end portion consequentially limiting the available surface collection area of said distal top surface portion.

The most efficient placement of circular eating plate 65 for the collection of raked prepared food items as shown in FIG. 5 occurs when a centerline of circular eating plate 65 is in flush communication with and parallel to raking edge end portion 40 of said countertop.

The inefficient prior art shown in FIG. 5 is unsanitary, messy and wasteful for the collection and transfer of prepared food items from atop a countertop to a kitchen receptacle.

Figure 6:
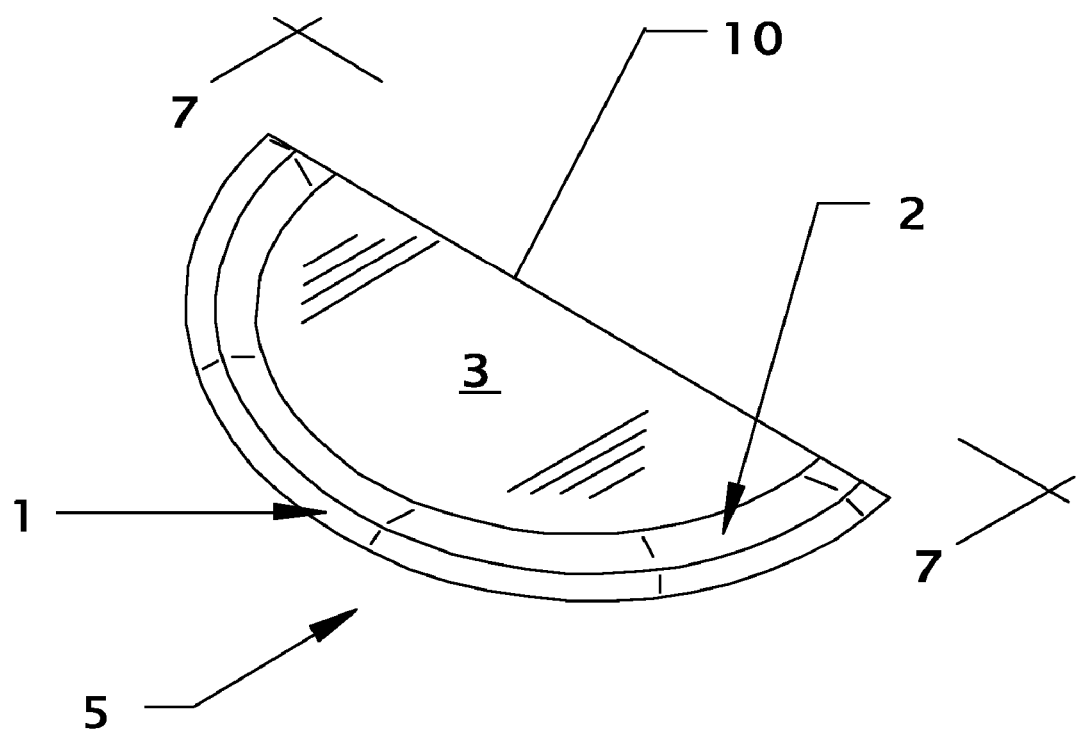
FIG. 6 is a perspective view of the novel present invention.
Figure 7:
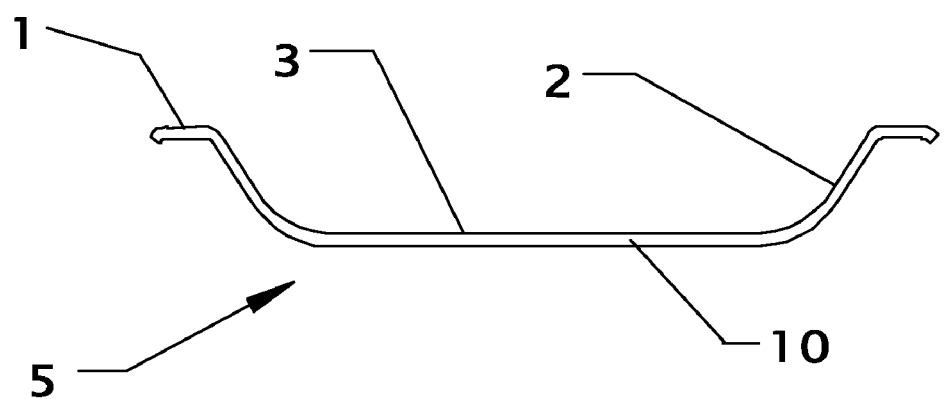
FIG. 7 is a side view of the novel present invention.

FIG. 6 and FIG. 7 show the novel present invention kitchen utensil 5 constructed as a shallow dished semi-circular plate, such as the resulting shape that would be obtained by cutting a common circular paper plate equally in half, which in this example would create two separate units of the present invention. A semi-elliptical plate could substitute for the semi-circular plate shown. Said kitchen utensil is comprised of a 180 degree arc outer rim and handle portion 1, a 180 degree arc inner flared wall portion 2, a collection and transfer surface portion 3, and a straight edge portion 10.

Figure 8:
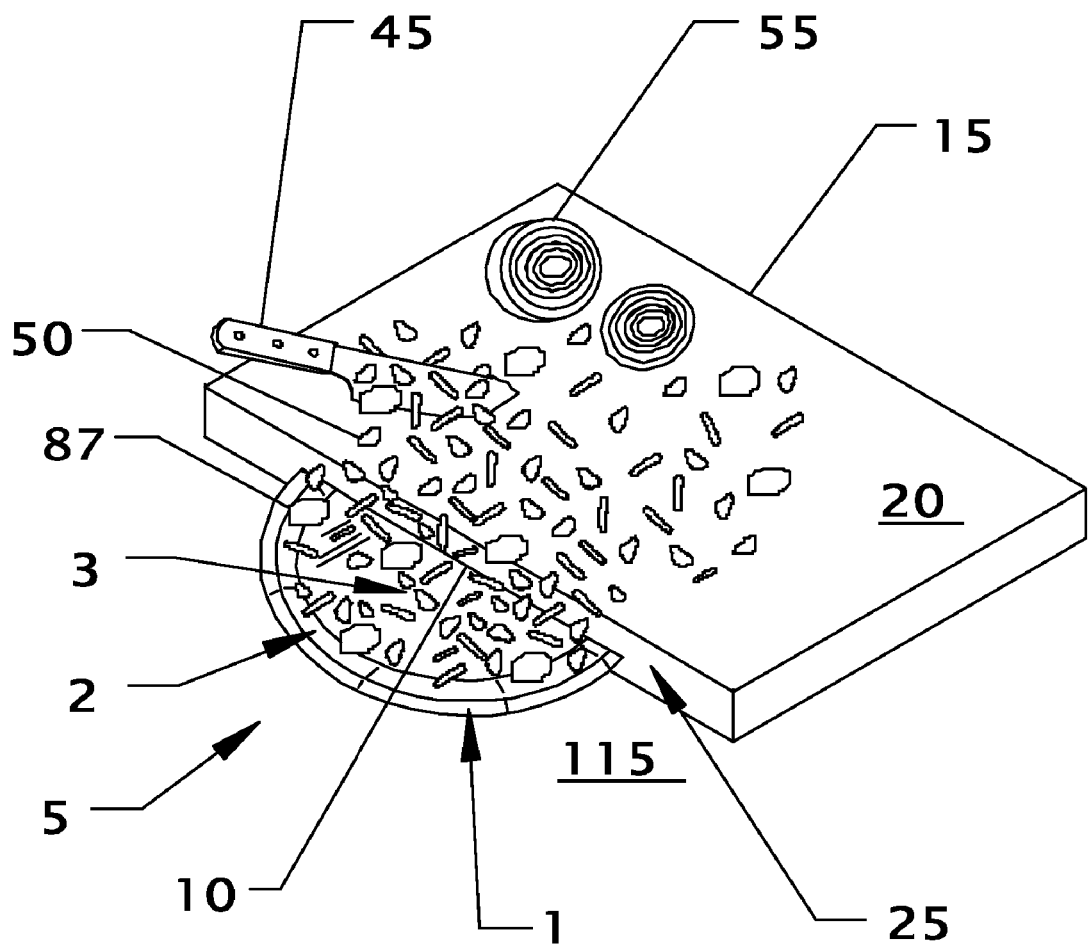
FIG. 8 is a perspective view depicting the present invention as a collection and transfer device by being butted against a typical kitchen chop board.

In FIG. 8, by holding rim and handle portion 1, straight edge portion 10 of kitchen utensil 5 is butted against a raking edge end portion 25 of a typical kitchen chop board 15 with food item 55 and prepared food items 50 located atop a chop board top surface 20. With straight edge portion 10 and raking edge end portion 25 in flush parallel communication, a plurality of prepared food items 50 are raked from atop chop board surface 20 toward and over raking edge end portion 25. Collected food items 87 are then received onto surface portion 3. Said raking means may be performed by using several methods including a typical kitchen knife 45 or a second kitchen utensil 5.

Kitchen utensil 5 receives and collects more raked food items over the prior art because straight edge portion 10 provides a means for efficiently communicating with raking edge end portion 25 thus creating more available surface collection area at said communication contact juncture between said kitchen utensil and said raking edge end portion. Said improved communication also easily avoids raked food items from undesirably collecting on adjacent surface 115. By holding rim and handle portion 1 with collected food items 87 located atop surface portion 3, prepared food items can now be efficiently transferred to a kitchen receptacle.

Figure 9:
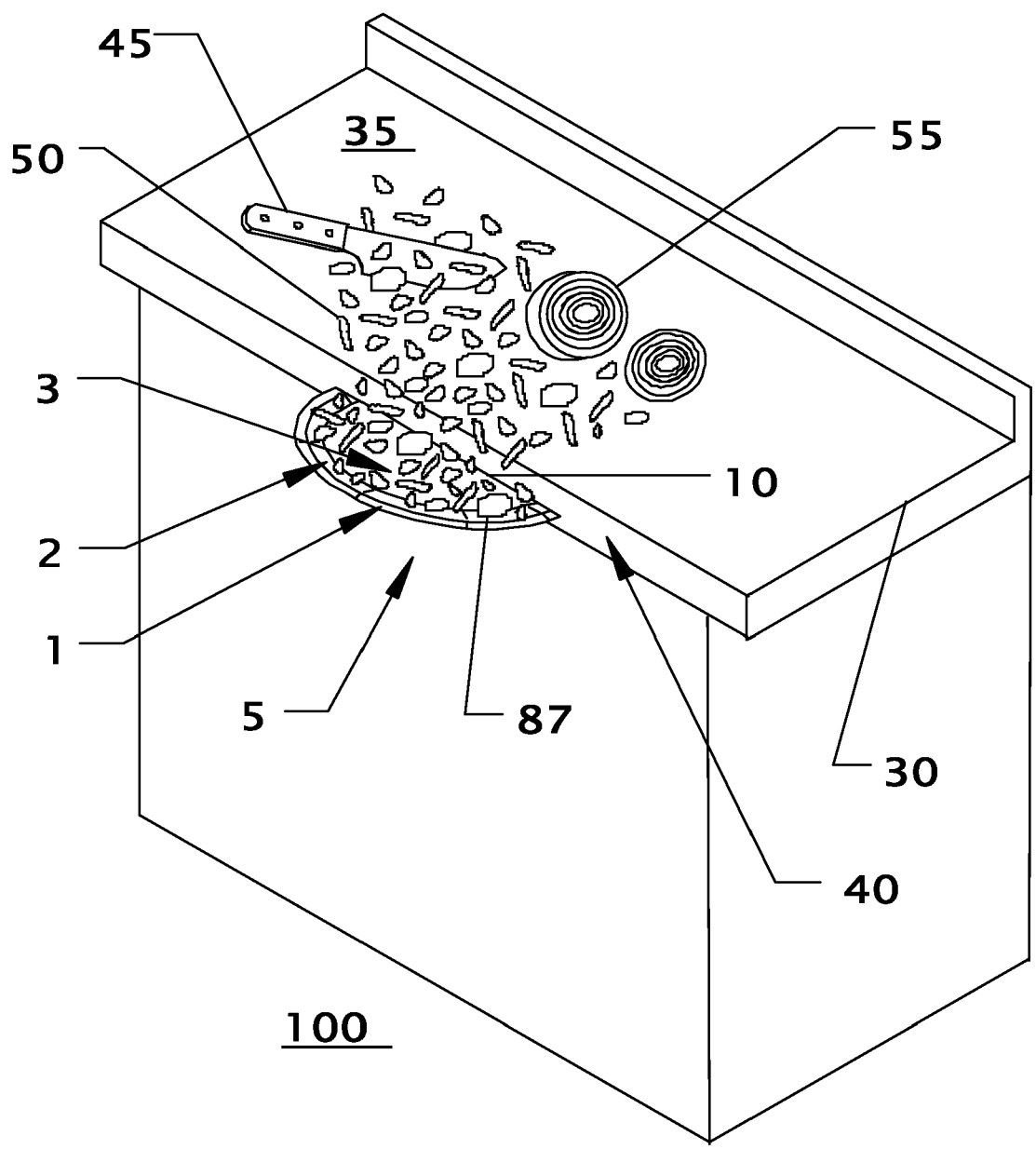
FIG. 9 is a perspective view depicting the present invention as a collection and transfer device by being butted against a typical kitchen countertop.

In FIG. 9, by holding rim and handle portion 1, straight edge portion 10 of kitchen utensil 5 is butted against a raking edge end portion 40 of a typical kitchen countertop 30 with food item 55 and prepared food items 50 located atop a countertop surface 35. With straight edge portion 10 and raking edge end portion 40 in flush parallel communication, a plurality of prepared food items 50 are raked from atop countertop surface 35 toward and over raking edge end portion 40. Collected food items 87 are then received onto surface portion 3. Said raking means may be performed by using several methods including a typical kitchen knife 45 or a second kitchen utensil 5.

Kitchen utensil 5 receives and collects more raked food items over the prior art because straight edge portion 10 provides a means for efficiently communicating with raking edge end portion 40 thus creating more available surface collection area at said communication contact juncture between said kitchen utensil and said raking edge end portion. Said improved communication also easily avoids raked food items from undesirably collecting onto a kitchen floor surface 100. By holding rim and handle portion 1 with collected food items 87 located atop surface portion 3, prepared food items can now be efficiently transferred to a kitchen receptacle.

Figure 10:
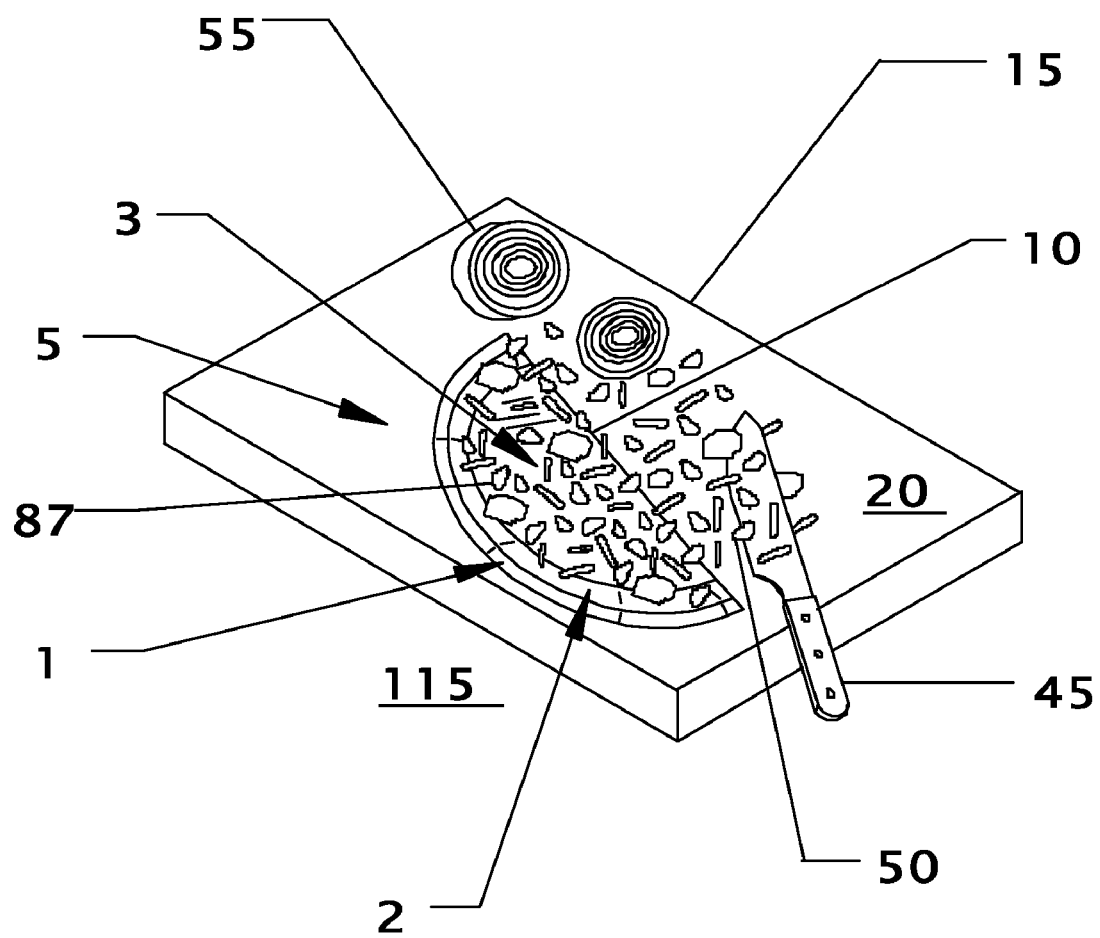
FIG. 10 is a perspective view depicting the present invention as an optional collection and transfer device by being placed against the top surface of a typical kitchen chop board.

FIG. 10 depicts the versatility of the present invention. By holding rim and handle portion 1, straight edge portion 10 of kitchen utensil 5 is placed in flush communication with a chop board surface 20 of a kitchen chop board 15 with food item 55 and prepared food items 50 located atop surface 20. With straight edge portion 10 and chop board surface 20 in flush communication, a plurality of prepared food items 50 are raked across chop board surface 20 toward and onto and received by surface portion 3. Said raking means may be performed by using several methods including a typical kitchen knife 45 or a second kitchen utensil 5. Said flush communication also easily avoids raked food items from undesirably collecting onto adjacent surface 115. By holding rim and handle portion 1 with collected food items 87 located atop surface portion 3, prepared food items can now be efficiently transferred to a kitchen receptacle.

Referring to FIG. 10, it is obvious that the present invention can be adapted for use with surfaces other than chop board or countertop surfaces, such as but not limited to, those previously identified surfaces mentioned under the heading Brief Summary of the Invention.

Alternatively, said prepared food items 50 may be food leftovers, food scraps, food waste, food crumbs, non-food items or general debris.

What is claimed is:

1. A method of making and using a kitchen receptacle for the collection and transfer of prepared food material from atop a food preparation or food serving surface having a straight edge end portion, comprising the steps of:

Forming a flexible dished, semi-circular or semi-elliptical receptacle by cutting an existing dished circular or elliptical food plate in half, resulting in two matching units, or manufacturing a dished semi-circular or semi-elliptical receptacle in the shape of half of a dished circular or elliptical food plate; and The receptacle having a generally curved proximal outer arc rim portion forming a handle, a shallow substantially horizontal planar combination food collection and food transfer surface portion, and a distal planar straight edge end portion; and Grasping the handle and positioning said straight edge end portion in flush parallel communication with the straight edge end portion of the food preparation or food serving surface;

Transferring prepared food material to the receptacle from atop the food preparation or food serving surface and bending the receptacle along a center axis extending from the proximal outer arc rim portion to the distal planar straight edge end portion, while food material is being discharged into a second receptacle.

* * * * *